Patented Nov. 10, 1936

2,060,654

UNITED STATES PATENT OFFICE 2,060,654

ALKYL CHLORO-RESORCINOLS

William E. Austin, New York, N. Y., assignor to Bank of The Manhattan Company

No Drawing. Application July 26, 1933, Serial No. 682,272

6 Claims. (Cl. 260—154)

This invention relates to new chlorinated alkyl resorcinols chracterized by the fact that the alkyl group is attached to the chloro-resorcinol nucleus by a carbon other than an end carbon and contains not less than four carbons.

The compounds may be represented by the general formula $C_6H_2Cl(OH)_2CR_1R_2R_3$ where $R_1$ may be hydrogen or an alkyl, and $R_2$ and $R_3$ alkyl groups, either straight chain or branched, the group $(CR_1R_2R_3)$ containing not less than four carbon atoms.

Among the alkyl chloro-resorcinols within the scope of this invention are the butyl, the amyl, the hexyl, the heptyl, the octyl, the nonyl derivatives of chloro-resorcinol, the alkyl in each case being joined to the chloro-resorcinol nucleus by a carbon other than an end carbon.

The new alkyl chloro-resorcinols may be obtained by introducing the chlorine into the corresponding alkyl resorcinols (described in a copending application) or by introducing the appropriate alkyl group into the chloro-resorcinol nucleus.

While the unchlorinated alkyl-resorcinols show especial antiseptic and germicidal qualities in those members containing seven or more carbons in the alkyl group, the new alkyl chloro-resorcinols manifest a much greater antiseptic and germicidal activity than the corresponding unchlorinated alkyl resorcinols in all the members containing four or more carbons in the alkyl group without any increased toxic properties. These very desirable qualities may be made available in the form of various antiseptic, germicidal and prophylactic solutions, jellies, lozenges or other vehicles, in proportions ranging up to five parts of the alkyl chloro-resorcinol for one thousand parts of the medium, and in special preparations for internal administration they may be used in higher concentrations ranging up to full strength.

Secondary hexyl chloro-resorcinol may be prepared by the process described in the following example: 55 g. resorcinol are dissolved in 50 c.c. anhydrous ether. To this solution are added slowly with stirring 67.5 g. sulfuryl chloride. Then the ether and gases (HCl and $SO_2$) are drawn off by means of an aspirator. 20 g. of secondary hexyl alcohol (methyl n-butyl carbinal,

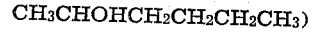
$CH_3CHOHCH_2CH_2CH_2CH_3$)

and 5 g. anhydrous zinc chloride are then added, the mixture heated to refluxing, and the water of condensation being distilled off, while the alcohol and hexylene (formed by dehydration) are returned to the reaction mixture through a water separator. Additional secondary hexyl alcohol is added gradually until the total amount is 55 g. The temperature gradually rises to 190° C., at which point the heating is discontinued, and the mixture allowed to cool. The mixture is taken up with toluene, washed several times with water, and distilled in vacuo. The fractions distilling between 155° and 185° C. (5 mm.) are redistilled, collecting the fraction boiling 165–180° C. 5 mm.).

Secondary octyl chloro-resorcinol may be prepared by the process described in the following example: 22 g. secondary octyl resorcinol (obtained by condensing resorcinol with secondary octanol (methyl n-hexyl carbinol,

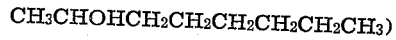
$CH_3CHOHCH_2CH_2CH_2CH_2CH_2CH_3$)

in the presence of the zinc chloride, and distilling the reaction product in vacuo, collecting the fraction between 190–210° C. (3 mm.) are dissolved in 30 c.c. absolute ether, then 13 g. sulfuryl chloride are slowly dripped in with constant stirring. Then the ether and the liberated gases (HCl and $SO_2$) are removed by means of an aspirator. The residue is then distilled twice in vacuo, the fraction between 165–180° C. (4 mm.) being collected.

It is to be understood that the foregoing embodiments are merely illustrative and by no means limitative of the invention which may assume various other forms—as to the particular alkyl chloro-resorcinols prepared, and as to the procedures employed—within the scope of the appended claims.

I claim:

1. Alkyl chloro-resorcinols of the general formula $C_6H_2Cl(OH)_2(CHR_1R_2)$ where H is hydrogen, and $R_1$ and $R_2$ are alkyls, the group $(CHR_1R_2)$ containing not less than four carbon atoms and being attached to the chloro-resorcinol nucleus by a carbon other than an end carbon.

2. Hexyl chloro-resorcinols in which the alkyl is a secondary hexyl group attached to the chloro-resorcinol nucleus by a carbon other than an end carbon.

3. Octyl chloro-resorcinols in which the alkyl is a secondary octyl group attached to the chloro-resorcinol nucleus by a carbon other than an end carbon.

4. Secondary hexyl chloro-resorcinol having the formula

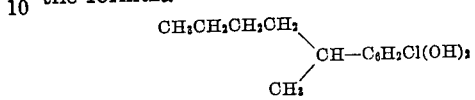

5. Secondary heptyl chloro-resorcinol having the formula

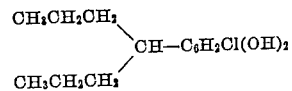

6. Secondary octyl chloro-resorcinol having the formula

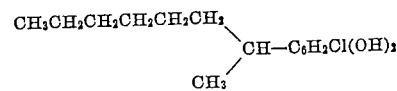

WILLIAM E. AUSTIN.